(12) United States Patent
Dimov et al.

(10) Patent No.: US 12,105,732 B2
(45) Date of Patent: Oct. 1, 2024

(54) QUERY EXECUTION ON A REPLICATED DATABASE WITH MOST RECENT DATA

(71) Applicant: INTERNATIONAL BUSINESS MACHINES CORPORATION, Armonk, NY (US)

(72) Inventors: Vassil Radkov Dimov, Stuttgart (DE); Daniel Martin, Leinfelden-Echterdingen (DE); Christian Michel, Sindelfingen (DE); Namik Hrle, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 265 days.

(21) Appl. No.: 17/658,158

(22) Filed: Apr. 6, 2022

(65) Prior Publication Data
US 2023/0325404 A1   Oct. 12, 2023

(51) Int. Cl.
  G06F 16/27   (2019.01)
  G06F 16/23   (2019.01)
(52) U.S. Cl.
  CPC .......... *G06F 16/27* (2019.01); *G06F 16/2379* (2019.01)
(58) Field of Classification Search
  CPC .. G06F 16/2365; G06F 16/27; G06F 16/2379; G06F 16/2386; G06F 16/2455; G06F 16/275; H04L 16/275
  See application file for complete search history.

(56) References Cited

U.S. PATENT DOCUMENTS

| | | | |
|---|---|---|---|
| 8,856,583 B1 | 10/2014 | Visser | |
| 10,282,363 B2 | 5/2019 | Hrle | |
| 10,372,726 B2 | 8/2019 | Brodt | |
| 10,599,636 B2 | 3/2020 | Lu | |
| 11,263,235 B2 | 3/2022 | Hrle | |
| 11,269,824 B1* | 3/2022 | Waas | G06F 16/2448 |
| 2016/0110439 A1* | 4/2016 | Hrle | G06F 16/2358 |
| | | | 707/600 |
| 2018/0046691 A1 | 2/2018 | Barsness | |
| 2018/0246945 A1 | 8/2018 | Lee | |

(Continued)

OTHER PUBLICATIONS

Dimov, et al., "Query Execution on a Replicated Database With Most Recent Data," Application and Drawings, Filed on Feb. 25, 2021, 41 Pages, Related US Patent Application Serial No. 21159131.8.

*Primary Examiner* — Kris E Mackes
(74) *Attorney, Agent, or Firm* — Teddi E. Maranzano (57) ABSTRACT

A method for executing a query on a target database against the most recent source data is disclosed. The method comprises maintaining linked—i.e., at least partially synchronized—databases comprising a source and a target database. The method comprises receiving a direct query against a table in the target database, the query comprising a request for using the most recent source data and requesting by the target database from the source database a status about latest data regarding the table. Upon the status indicating that data in the table do not correspond to the most recent data, the method comprises waiting up to a predefined time period for the most recent data of the table to be synchronized from the source database to the target database, and upon the data of the table not being synchronized within the predefined time period, the method comprises issuing a timeout signal.

20 Claims, 6 Drawing Sheets

(56) References Cited

U.S. PATENT DOCUMENTS

| | | |
|---|---|---|
| 2019/0220467 A1 | 7/2019 | Hrle |
| 2019/0220468 A1 | 7/2019 | Hrle |
| 2020/0110674 A1* | 4/2020 | Kim .................... G06F 11/3055 |
| 2022/0171787 A1* | 6/2022 | Chen ................... G06F 16/9017 |

* cited by examiner

QUERY EXECUTION ON A REPLICATED DATABASE WITH MOST RECENT DATA

BACKGROUND

The invention relates generally to a method for executing a query on a linked database against most recent source data, and more specifically, to a computer-implemented method for executing a query on a target database against a copy of the most recent source data. The invention relates further to a database system for executing a query on a target database against a copy of the most recent source data, and a computer program product.

Managing large amounts of data remains a continuous problem for enterprise IT (information technology) organizations. This is due to the ever-growing amount of data and also due to the variety of the data. In addition to traditional structured data, also semi-structured and so-called unstructured data are stored in large amounts in enterprise IT systems. Furthermore, in addition to traditional transaction oriented databases, special database systems optimized for analytical processing, have been introduced to satisfy the industry requirement for more and more data analytics. On the other hand, attempts have been made to do all analytical processing in a traditional transactional database. However, it turned out that the analytic processing has a too strong and unpredictable influence on the performance of online transaction processing.

As a consequence, clever combinations of transaction oriented database management systems with analytics optimized database management systems have been introduced. One example of such combined products is based on the IBM DB2 Analytics Accelerator (IDAA) architecture.

On one side, a full-blown row-based database management system (DBMS) may serve as an application endpoint for data manipulation language (DML) operations and query executions. Using heuristic decision criteria and rules, the query optimizer may transparently decide whether a query should be executed on the source DBMS—especially online transaction processing—or offloaded to a target DBMS—in particular, for online analytical processing.

The target DBMS may be a full-blown column-based database management system holding a shadow copy of a selected set of the source DBMS tables. Strategies for creating shadow copies of the target DBMS may comprise transferring data stored in one or more tables of the source DBMS to the target DBMS at a given point in time. However, query data in the target DBMS might be out of date if the loading was performed some time ago and the corresponding source table has been modified in the meantime. Therefore, the contents of the tables are usually adapted incrementally as changes are recorded in the corresponding source database tables.

Both database systems implement transaction mechanisms to guarantee ACID (atomic, consistent, isolation, durable) properties of the respective database. I.e., concurrent modifications are properly isolated via locking techniques, and consistency checks may guarantee that the database state is transferred from one consistent state to another one and, logging techniques such as write-ahead-logging may be implemented in order to guarantee atomicity and durability for transactional changes.

However, guaranteeing ACID properties may cause significant overhead when the source database is modified by current transactions. In particular, logging slows down processing insert/update/delete (IUD) statements because change records have to be written to a persistent storage medium before transactions can continue. Compared to the frequently used in-memory processing of changes to the content of the database table, adding this persistence layer using transaction logs is comparatively slow. On the other hand, a crash recovery is required to restore the latest consistent state of the respective database in the event of a failure.

In the database accelerator context, like IDAA, the target accelerator database may simply mirror a snapshot of the source database. I.e., the source database may act as the master of the data, or data manipulations via IUDs may be processed by the source database management system and, changes are replicated to the target database via an update technique. The accelerator database, therefore, may act as a cache for storing partitions of the source database that may need fast analysis operations.

In even newer implementations, a direct access to the target database may also be possible—i.e., without addressing the source database first. However, in these situations, problems may occur in terms of data actuality.

A couple of documents have been published in this context. E.g., document U.S. Pat. No. 8,856,583 B1 disclosed a method "to complete a failover operation on a replicated distributed database system and ensure access invariance of the replicated distributed database system. a method for performing a failover operation between a first distributed database cluster and a second distributed database cluster."

Additionally, document US 2018/0246945 A1 describes a method "for capturing and replaying a database workload by obtaining a workload capture file comprising execution context information generated in a database system and replayable to replicate the workload, generating a modified workload capture file by generating modified execution context information, replaying the modified workload capture file by generating at least one read statement based on the modified workload execution information and issuing at least one read statement to a primary database system having an associated secondary database system, determining that the at least one read statement may be routed to the secondary database system for execution, and routing the read statement to the secondary database system for execution."

However, these documents miss to describe a direct access to the target database and the involved problems with the currency of the available data. Therefore, it is an objective of the here proposed concept to address the inability of traditional techniques to handle a direct access to a target database and maintain data actuality at the same time.

SUMMARY OF THE INVENTION

According to one aspect of the present invention, a computer-implemented method for executing a query on a target database against a copy of the most recent source data may be provided. The method may comprise maintaining linked databases comprising a source database and a related target database, wherein tables of the source database are continuously synchronized with respective tables in the target database, receiving a direct query against a table in the target database, the query comprising a request for using the most recent source data, and requesting by the target database from the source database a status about latest data regarding the table.

The method may also comprise—upon the status indicating that data in the table do not correspond to the most recent data—waiting a predefined time period for the most recent data of the table to be synchronized from the source database to the target database, and—upon the data of the table not being synchronized within the predefined time period—issuing a timeout signal.

According to another aspect of the present invention, a database system for executing a query on a target database against a copy of the most recent source data may be provided. The database system may comprise a processor and a memory, communicatively coupled to the processor, wherein the memory may store program code portions that, when executed, may enable the processor to maintain linked databases comprising a source database and a related target database. Thereby, tables of the source database may be continuously synchronized with respective tables in the target database.

The processor may—when executing the program code portions—also be enabled to receive a direct query against a table in the target database, wherein the query may comprise a request for using the most recent source data.

The processor may—when executing the program code portions—also be enabled to request by the target database from the source database a status about latest data regarding the table, and—upon the status indicating that data in the table do not correspond to the most recent data, wait a predefined time period for the most recent data of the table to be synchronized from the source database to the target database, and—upon the data of the table not being synchronized within the predefined time period—issue a timeout signal.

The proposed computer-implemented method for executing a query on a target database against a copy of the most recent source data may offer multiple advantages, technical effects, contributions and/or improvements:

It may allow a more flexible usage of the data in the linked database management systems, namely, the source DBMS and the target DBMS. Traditionally, access to the data of the target database may have been implemented by a query against the source DBMS, which may then have been forwarded or offloaded to the target DBMS. However, this may result in additional workload to the DBMS which may be avoided. Instead, a read-only transaction, an analytical or any kind of read-only query may be directed directly against the target database which may be optimized for analytical or transactional workloads. Hence, the circumvention via the source database may be avoided. In this case, the result of the query may also be generated directly from the target DBMS. This may help to increase the performance of the linked database DBMSs and thus reduce the latency of queries.

This concept may also work in case the source DBMS is down for whatever reason. I.e., at least read queries may be directed to the target DBMS although the source DBMS may be in a non-operational state.

On the other side, using the status request from the target DBMS to the source DBMS, it may—if required—be ensured that the query against the involved table of the target DBMS is executed against the most recent data available in the source database of the query data in the target database. If the request for the most recent data—in particular, a WAITFORDATA request—may be included in the query against data of a table and the target DBMS, and if it cannot be confirmed—in particular, after a predefined time period—that the most recent data are used, the target database may issue a timeout status indicating that in the given predefined time period it cannot be guaranteed that the target database comprises the most recent data of the source database at the time of the query submission. Again, this information may be derived from a comparison of timestamps of data records in the involved table or the complete table in the target database versus a timestamp of a COMMIT statement for the respective data in the source database. The timestamp of the COMMIT statement may be derived from the metadata of the respective database table(s) or, alternatively, from the log-file of the source database such so that it does not adversely affect the generic performance of the source database. Instead of a timestamp, also a log-record sequence number can be used as status indicator.

It may again be highlighted that—if compared to traditional implementations—the concept proposed here relies on a fine-granular concept with regard to the synchronization of tables or data thereof from the source database to the target database. Hence, not the status of the respective database itself but the status of a table or a part thereof—in particular, dedicated table entries—are queried regarding their most recent status. This may allow a more precise synchronization check because only those tables that are involved in the query against the target database are checked for the status of the actuality of the respective data in the source database. Hence, the performance of the overall system can be increased because it is not required that the complete databases—i.e., the source database and the target database—need to be synchronize completely but only parts thereof.

As an additional advantage, is should be mentioned that also transactional workloads may be directed towards the target database without the circumvention of addressing the source database first. E.g., in mobile banking in which a customer may update its current account balance several times a day this comparably easy query may be directly offloaded to the target database. Queries like this are difficult to estimate in volume in advance. They may potentially bring down the performance of the source database significantly. Thus, being able to direct such simple queries directly to the target database would be of significant benefit if compared to traditional approaches.

In the following, additional embodiments of the inventive concept—applicable for the method as well as for the system—will be described.

According to an advantageous embodiment of the method, the requesting by the target database from the source database a status may also comprise—upon the status indicating that data in the table correspond to the most recent data—executing the query. The status may be requested by a lightweight request from the target database to the source database and may only require a little time delay. The advantage may be seen in the fact that a direct query against the target database may guarantee the latest data available in the involved table of the database system comprising both, the source and the target database.

According to one preferred embodiment of the method, the synchronization from the source database to the target database may be performed by reading a recovery log-file of the source database. This may represent an elegant mechanism to keep the source database and the target database in sync. A process reading the recovery log-file of the source database—which may always and continuously be generated—does not represent an additional load to the source database. The subsequent update of the target database may be made record-by-record, in small blocks of a predefined number of records or, in a bulk load process. The latter being the preferred solution for the initialization of the target database.

According to an embodiment of the method, the target database may be an in-memory database. Such a database may have advantageous characteristics if a large number of different tables or a large number of records of the same table may be involved in a query. This may often happen for analytical workloads. Besides being stored completely in main memory, portions of the target database may also be stored in a persistent portion of the target DBMS.

According to another embodiment of the method, the source database may be optimized for transactions (i.e., transactional workloads) and/or wherein the source database is a row-oriented relational database management system. Hence, this may be the characteristic of the primary database supporting an end-user application. Often, customer records or order entries or payment records have to be read or updated. These days, transactional databases may primarily be used for reporting of the ongoing entries and less for heavy load analytical operations. If the transactional part of a combined or linked database system may be complemented by a target database optimized for OLAP queries, both user communities—in particular, transactional users and analytical users and requirements— may be satisfied best.

Hence, and according to another interesting embodiment of the method, the target database may be optimized for analytical operations and/or the target database is a column-oriented database management system. Such database systems may be best suitable for OLAP workloads.

According to an advanced embodiment of the method, the status about latest data regarding the table may be a timestamp of a latest COMMIT command executed by the source database for the table (alternatively, a log-file sequence number). This SQL (structured query language) command may be used to finalize and save changes invoked by a transaction to the database. The COMMIT command thereby may save all the transactions of the database since the last COMMIT or ROLLBACK command. It may also clear intermediate tables.

According to an advantageous embodiment of the method, the continuous synchronization may be performed by a bulk load to the target database. The bulk may comprise only a couple of records or the complete content of a table. The latter option may be especially useful to initialize the target database. Alternatively, the continuous synchronization can also be performed record by record, whenever a new log-file record is written by the source database system and read by the target database update process.

According to one optional embodiment of the method, the target database may be used for read-only operations. This may often be the case for a database which may be OLAP optimized.

According to an optional, but nevertheless advantageous, embodiment, the method may also comprise using, instead of the table, all replicated tables if none of the tables of the target database may be specified. This may open up some further advantageous treatments or operations on the source database with respect to the requested status of the source database. For example, the status may be directed at all replicated tables. By this, also dependencies between the source databases which relate to synchronized tables in the target database may be reflected.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating or transporting the program for use, by, or in connection, with the instruction execution system, apparatus, or device.

BRIEF DESCRIPTION OF THE SEVERAL VIEWS OF THE DRAWINGS

It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject—matter, also any combination between features relating to different subject-matters, in particular, between features of the method type claims, and features of the apparatus type claims, is considered as to be disclosed within this document.

The aspects defined above, and further aspects of the present invention are apparent from the examples of embodiments to be described hereinafter and are explained with reference to the examples of embodiments, to which the invention is not limited.

Preferred embodiments of the invention will be described, by way of example only, and with reference to the following drawings.

DETAILED DESCRIPTION

In the context of this description, the following conventions, terms and/or expressions may be used:

The term 'source database'—or 'primary database'—may denote a database being optimized for, e.g., fast transactions, i.e., online transaction processing. However, databases optimized in such a way—i.e., for fast read, write, update operations on the data—may be slow in performing complex queries involving a high number of tables or a large number of data, like in the case of online analytical processing. Additionally, the online analytical processing may slow down the online transaction processing. Therefore, highly optimized database management systems of the just mentioned types of databases may successfully work as a tandem. The source database may be a relational database with database table storing data in records The term 'target database'—or 'secondary database' may denote the second database in such a tandem of databases being optimized for different tasks. In the context of the here described concept, the target database may be optimized for online analytical processing. It may store at least portions of the tables and portions of the data in the tables of the source database. The target database may also be comprised of two portions: an in-memory portion for a fast execution of complex and multi-dimensional queries, and a persistent portion which may store the tables and data of the in-memory portion of the target database on the longer-term storage, e.g., a hard disk or a flash memory. This way, the target database may be enabled to—in case of a crash of the target database—recover most of its content from the persistent storage. In some contexts, the target database may also be denoted as accelerator or accelerated database. Also, the target database may be a relational database with database table storing data in records; and for access optimization reasons the organization of the data may be column-wise.

The term 'linked databases' may denote at least two databases that are closely related to one another. In the context of this document linked databases may be denoted as those that may store, at least in part, identical data. On the other hand, the primary database—i.e., the source database may be optimized for other tasks than the secondary database, i.e., the target database. In other words, the target database may be synchronized with parts of the source database.

The term 'being synchronized' may denote that—in an ideal case—the content in the target database table may be identical with the content of the corresponding table and the source database. However, this may not always be possible or required because the entries that have just been committed to the source database must be transformed, transmitted and the target database has to be updated. This may require some time in which new updates may already have happened in the source database. I.e., the status of the target database may time-wise always be slightly behind the source database; however, despite this fact, the respective database tables or portions thereof shall be denoted as being synchronized or continuously synchronized.

The term 'direct query' may denote a query against the target database that does not originate or being forwarded from the source DBMS. In such a case, the source database is not involved at all apart from the fact that in case of a request for most recent or most current data a status request regarding the respective data may be requested from the source database.

The term 'most recent source data' may denote data in a table of the source database that have a confirmed status, e.g., after a COMMIT command in the source DBMS. This status may be time-wise fixed by a timestamp or sequence number in the log-file of the source DBMS because every command against the source database may be logged in the respective log-file.

The term 'status' may denote a state or situation an entry of a table in the source database is in. The status may, e.g., be 'in update', 'in transition' or 'confirmed and stable', i.e., committed and finally updated after a COMMIT command.

The term 'recovery log-file' may denote a sequential file protocolling operations being performed on a database, particularly, all those operations that modify the data, i.e., insert, update and delete operations. The recovery log-file may be designed to allow a complete reconstruction of the database. Therefore, also the table definitions of the database may be part of the recovery log-file.

The term 'in-memory target database' may denote the part of the target database which may hold almost all of its data in the main memory of the computer system. Hence, the database management system of the target database may comprise an in-memory portion and optionally also a persistent portion of the target database, wherein the persistent portion may be—apart from the last changes to the in-memory—a persistently stored copy of the in-memory portion.

In the following, a detailed description of the figures will be given. All instructions in the figures are schematic. Firstly, a block diagram of an embodiment of the inventive computer-implemented method for executing a query on a target database against a copy of the most recent source data is given. Afterwards, further embodiments, as well as embodiments of the database system for executing a query on a target database against a copy of the most recent source data will be described.

Figure 1:
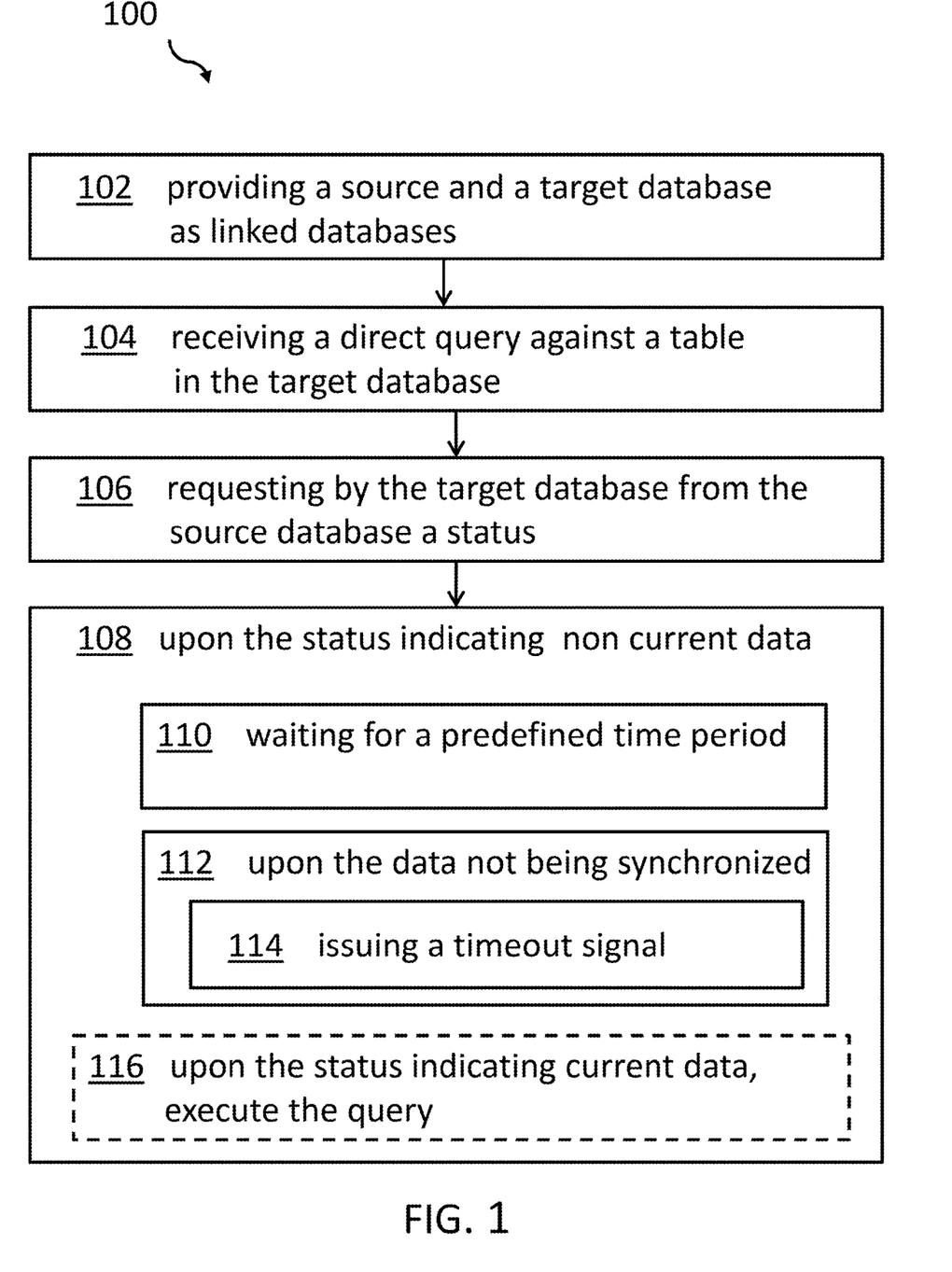
FIG. 1 shows a block diagram of an embodiment of the inventive computer-implemented method for executing a query on a target database against a copy of the most recent source data.

FIG. 1 shows a block diagram of a preferred embodiment of the computer-implemented method 100 for executing a query on a target database against a copy of the most recent source data. The method comprises maintaining, 102, linked databases comprising a source database and a related target database. The tables of the source database are continuously synchronized—in particular, on an ongoing basis by reading the source database's log-file—with respective tables in the target database. The synchronization process may be performed selectively and configurable. After the reading of the source database's log file, the records may be transferred to the target database were the content may be used to update the target database.

The method 100 also comprises receiving, 104, a direct query against a—in particular, at least one "involved" table—in the target database. Thereby, the query comprises a request for using the most recent source data. A specific command, e.g., WAITFORDATA, may be used to force this target database characteristic.

As a consequence of the previous step, the method 100 also comprises requesting, 106, by the target database from the source database a status about latest data regarding the involved table. This may, e.g., be implemented by a timestamp of the last COMMIT command or a monotonically increased counter. The log-file records may be used for this status check.

Furthermore, and upon the status indicating that data in the table do not correspond to the most recent data (108), the method 100 comprises waiting, 110, a predefined time period for the most recent data of the table to be synchronized from the source database to the target database. I.e., this synchronization may be based on the anyway implemented synchronization from the source database to the target database, i.e., the synchronized tables or parts thereof. The synchronization process may check regularly whether new data have to be synchronized.

Last but not least and upon the data of the table not being synchronized within the predefined time period (112), issuing, 114, a timeout signal. Hence, the request for the most recent data for a specific table cannot be fulfilled and based on the timeout signal, an error code may be issued.

However, if the status indicates current or the most recent data for the specific, involved table, the query is executed against the target database. This is indicated in FIG. 1 as a dashed box 116 indicating an optional method step.

Figure 2:
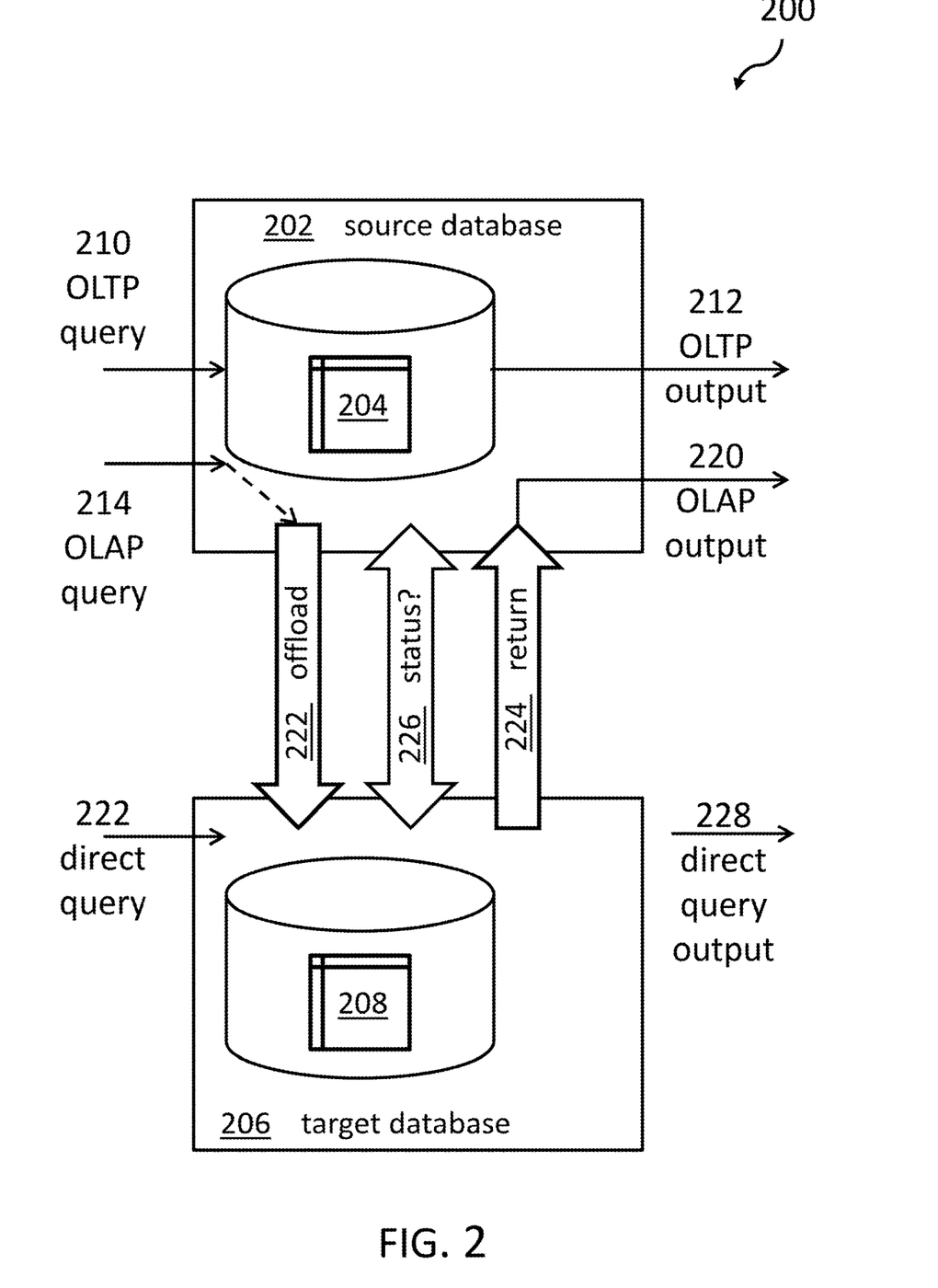
FIG. 2 shows a block diagram of an embodiment of two linked databases, a source database and the target database and related types of queries.

FIG. 2 shows a block diagram of an embodiment 200 of linked databases. The primary or source database 202 typically receives OLTP queries 210 and OLAP queries 214. Those queries that are identified as OLAP queries 214 can be transferred or offloaded, 222, to the secondary or target database 206. The source database 202 comprises a plurality of tables 204 and related stored data. The target database 206 also comprises tables which represent at least a subset of the database tables 204 of the source database 202 and at least a subset of the data in a specific database table 208.

After the OLAP operation has been performed by the target database 206, the data are returned, 224, and the OLAP output 220 is returned back to the requesting program or process. OLTP queries 210 are executed directly in the source database 202 and returned as OLTP output 212 to the requesting program or process. Hence, the OLTP or source database 202 may operate at its best performance because it is not slowed down by any resource intensive OLAP queries.

Because of a potentially different data organization in the target database 206—e.g., column-oriented instead of row-oriented as in the source or OLTP database 202—the target database 206 may return, 224, OLAP results much faster than the source database 202.

Additionally, it is also advantageously possible that at selective cases, a direct query 222 is directed directly to the target database 206 as, e.g., read-only OLAP or read-only OLTP query 222. In such a case, the source database is not involved in the query process apart from the fact that the target database may query, 226, the status regarding the most recent data in the source database 202, as indicated by the double arrow 226. In this scenario, the target database provides the read-only OLAP or read-only OLTP output 228 directly.

Figure 3:
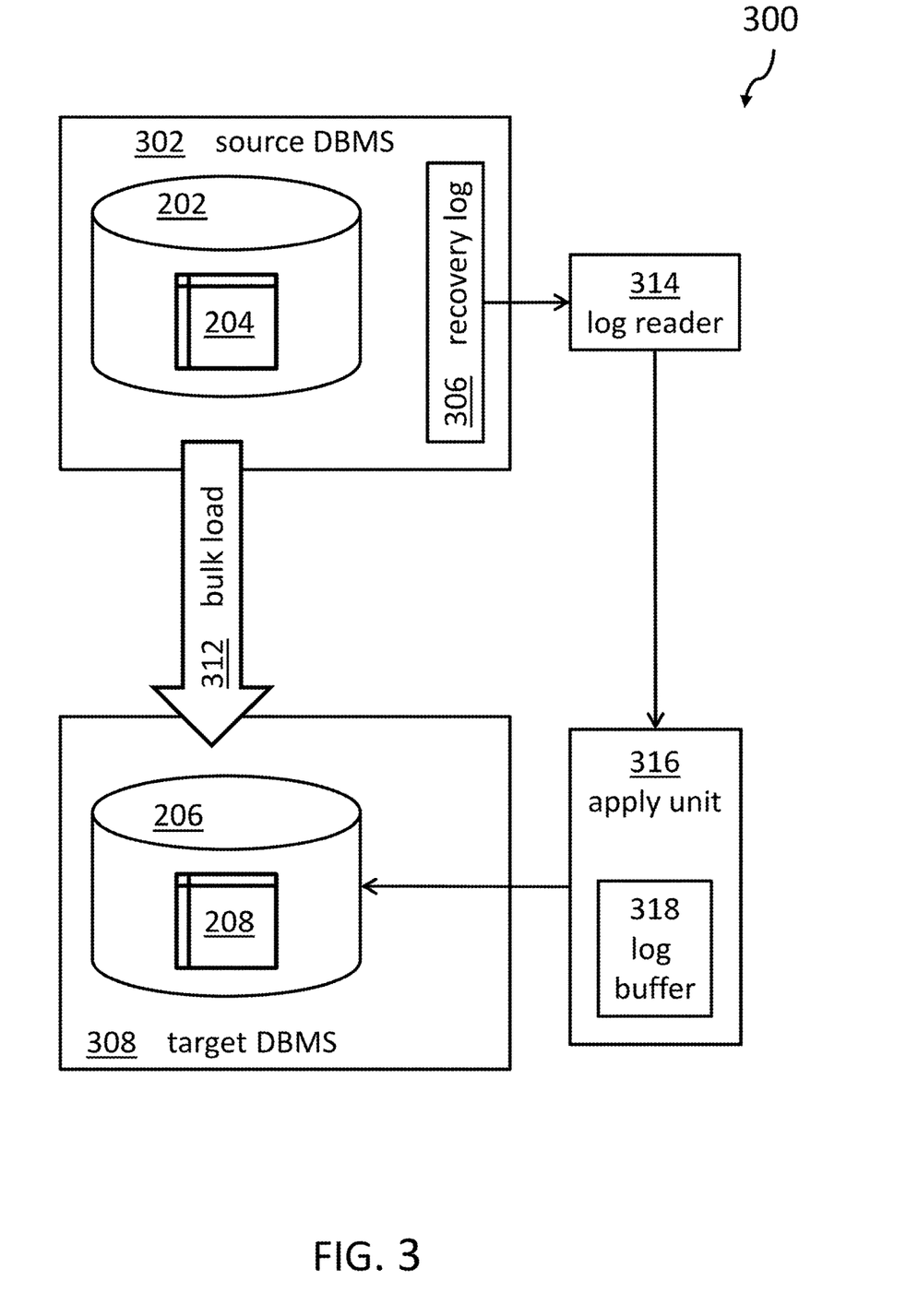
FIG. 3 shows a block diagram of an embodiment of a synchronization process between the source DBMS and the target DBMS.

FIG. 3 shows a block diagram of an embodiment 300 of how the target database is synchronized. The source database management system 302 controls the operation of the source database 202 and its related tables 204 (compare FIG. 2). The same applies to the target database management system 308 for the target database 206 and the related tables 208.

The source database management system 302 also maintains the recovery log file 306 for the source database 202. A log reader or log file reader 314 reading the recovery log file 306 provides these data to the applying unit 316 which applies the changes (i.e., insert, update, delete) performed to the source database also to the target database 206 for the selected tables and the selected set of data. The selected tables and the selected set of data may be a subset of those related tables and data in the source database 202, as defined beforehand. The applying unit 316 can optimize the application of the changes to the target database 206 depending on executed OLAP queries. For this, the log buffer 318 can be instrumental.

For an initialization of the target database 206, a bulk load operation 312 can be performed for performance reasons from the source database 202 to the target database 206.

Figure 4:
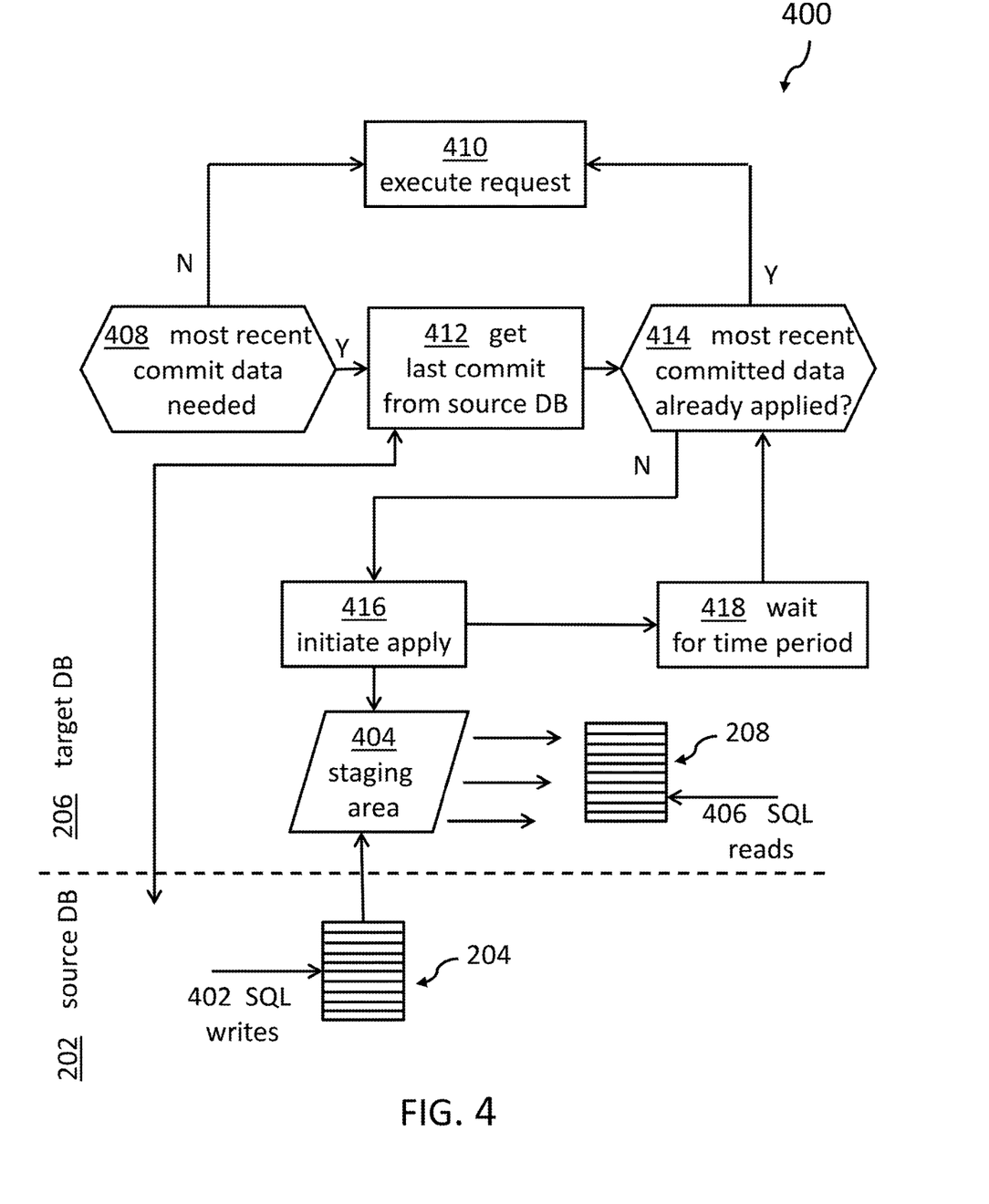
FIG. 4 shows a block diagram of a more implementation-near embodiment of the proposed method and process.

FIG. 4 shows a block diagram of a more implementation-near embodiment 400 of the proposed method and process. The area below the horizontal dashed line relates to the source database 202 while the area above the dashed line relates to the target database 206. Exemplary, a source database table 204 is shown against which, e.g., SQL write operations 402 can be executed.

The novel process flow for an execution of a query on the target database 206 is shown in the upper portion of FIG. 4 so that the query can be executed on the most recent committed source data at the query submission time against the target database, or more precisely, by an SQL read statement 406 against an involved target database table 208.

The process starts from the target database 206 and requires an indication through the replication engine to the source and then back to the target database. Firstly, a SQL query 406 involving one or more replicated tables in the target database 206 is submitted against the target database 206. Then, in case the query contains a request to wait for the currently most recent source data—in particular, the WAITFORDATA request—the target database 206 needs to ask the replication engine (not shown here but compare FIG. 3) to verify when these data are replicated to the target database 206. Under normal operation, the staging area 404 in the target DBMS is used to keep the target database table 208 in synchronization with the source database table 204.

The replication engine or the related process needs to obtain the most recent state of the source database, or more precisely the source database table in question, in terms of log position. This could happen through a communication with the log reader component (compare FIG. 3, 314) of the source database 202.

Hence, it is firstly determined as part of the received read query 406 against a table in the target database 206 whether the most recent commit data of a table are needed, 408. If that is the case—case "Y"—the last COMMIT from the source database 202 is requested, 412. If that is not the case—case "N"—the query is executed, 410, against the target database table 208 immediately.

After having received the last COMMIT regarding the involved source database table in step 412, the process continues with the determination whether the most recent committed data have already been applied to the target database table 208 in the determination 414. If that is the case—case "Y"—the query is executed immediately, 410. If that is not the case—case "N"—an apply command is initiated, 416, so that the data are potentially being present in the staging area 404 are applied to the target database table 208. The process then waits, 418, for a predefined time period, to check again whether the most recent committed data have already been applied, 414.

In other words, after acquiring the most recent state of the table of the source database 202, the replication engine should initially check whether the data involved have already been replicated in the respective table 208 of the target database 206. If the data are still not replicated, then the replication engine continues the data replication process while waiting for the required data no longer than a predefined time period. During the period, the state of the replicated data is regularly checked.

If the required data are replicated to the target database 206 table 208, in the required time period, the target database 206 is notified, and the process continues with a regular execution of the query (compare 410). Otherwise, the SQL query 406 against the target database with a WAITFORDATA request will fail with an appropriate message informing that the source data required for the query was still not in the target database 206 in the specified time period.

It should also be mentioned that in the determination step 408 the target DBMS 206 has to differentiate between normal queries and queries that need to wait for the most recent source data, i.e., queries with a WAITFORDATA request. Thus, an extension to the SQL syntax may be required. This extended syntax needs to specify for how long the query should be delayed at most, in order to wait for the most recent data. A simple possible syntax could be:

SELECT count(*) FROM example_table WAIT FOR DATA 5

With that, the user process specifies that a query should be executed on the most recent source data on the target database 206 table 208 and wait up to five seconds for this data to be replicated.

Additionally, the target database 206—or the target DBMS—should be able to communicate with the replication engine when a query with a WAITFORDATA request is submitted. The target database should be able to initiate the communication (steps 408, 412) and get notified once the most current source data are replicated, or the specified timeout is reached. In this context of the common occasion, the target database needs to share a list with the replicated tables involved in the WAITFORDATA query.

Additionally—in particular in step 412—the replication engine needs to know what the most recent involved source data state is. This is denoted by the current log position of the source database (e.g., LRSN, i.e., log record sequence number). In this regard, one can observe the overall new log position, or the new log position only for the replicated tables that are contained in the query with a WAITFOR-DATA request. For that, the replication engine should be able to communicate with the log reader interface that returns the log position based on the given, involved tables. Consequently, either a timestamp or the log position, e.g., the log record sequence number can be used.

Furthermore, after the replication engine has obtained the current state of the table in the source database 202 an additional loop may also be required to wait for the corresponding log position in the target database 206 to be replicated.

If compared to traditional implementations, step 412 of the process, described in FIG. 4, the log reader should be able to acquire the new log position, as requested by the replication engine. This could be either the overall new log position or the highest log position for the given list of replicated involved tables.

Figure 5:
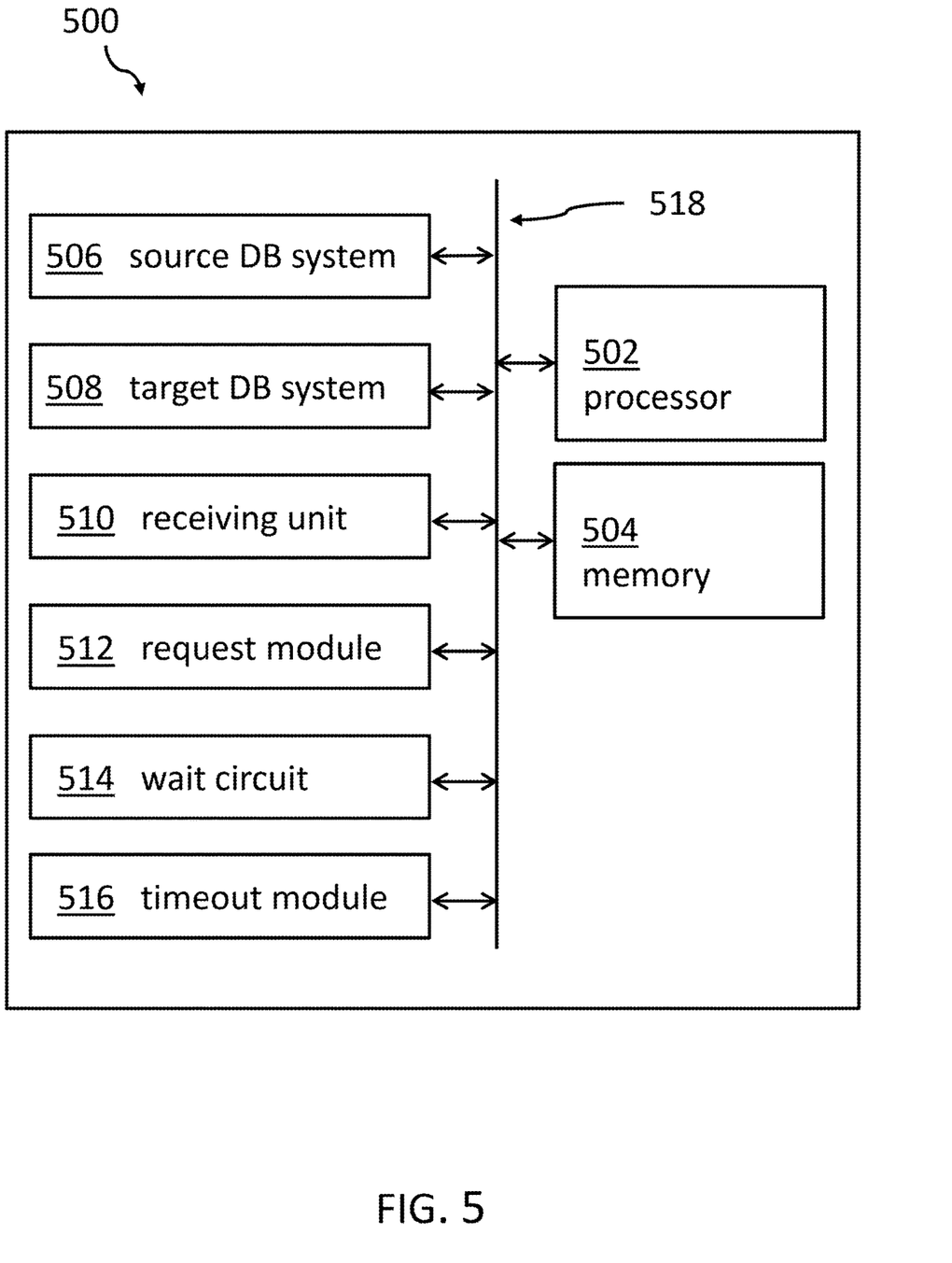
FIG. 5 shows a block diagram of an embodiment of the inventive database system for executing a query on a target database against a copy of the most recent source data.

FIG. 5 shows a block diagram of an embodiment of the database system 500 for executing a query on a target database against a copy of the most recent source data. The database system 500 comprises at least a processor 502 and a memory 504, communicatively coupled to the processor 502, wherein the memory 504 stores program code portions that, when executed, enables the processor 502 to maintain linked databases comprising a source database 506 and a related target database 508, wherein database table entries of the source database 506 are continuously synchronized with respective database table entries in the target database 508.

The processor 502 is also enabled to—in particular when executing the stored program code portions—to receive—in particular using a receiving unit or receiver 510—a direct query against a table in the target database 508, wherein the query comprises a request for using the most recent source data. The processor 502 is also enabled to—in particular, when executing the stored program code portions—to request—in particular, by a request module 512—by the target database 508 from the source database 506 a status about latest data regarding the involved table (or a plurality of tables).

The processor 502 is also enabled to—in particular when executing the stored program code portions—upon the status indicating that data in the table do not correspond to the most recent data, to wait—in particular, using the wait circuit 514—a predefined time period for the most recent data of the table to be synchronized from the source database 506 to the target database 508.

Last but not least, the processor 502 is also enabled to—in particular, when executing the stored program code portions—upon the data of the table not being synchronized within the predefined time period, to issue a timeout signal. This timeout signal can be generated by a timeout module 516.

It shall also be mentioned that all functional units, modules and functional blocks may be implemented in hardware, software or a combination thereof and may be communicatively coupled to one another for signal or message exchange in a selected 1:1 manner. This may apply in particular to the processor 502, the memory 504, the source database system 506, the target database system 508, the receiving unit 510, the request module 512, the wait circuit 514 and the timeout module 516. Alternatively, the functional units, modules and functional blocks can be linked to a system internal bus system 518 for a selective signal or message exchange.

Figure 6:
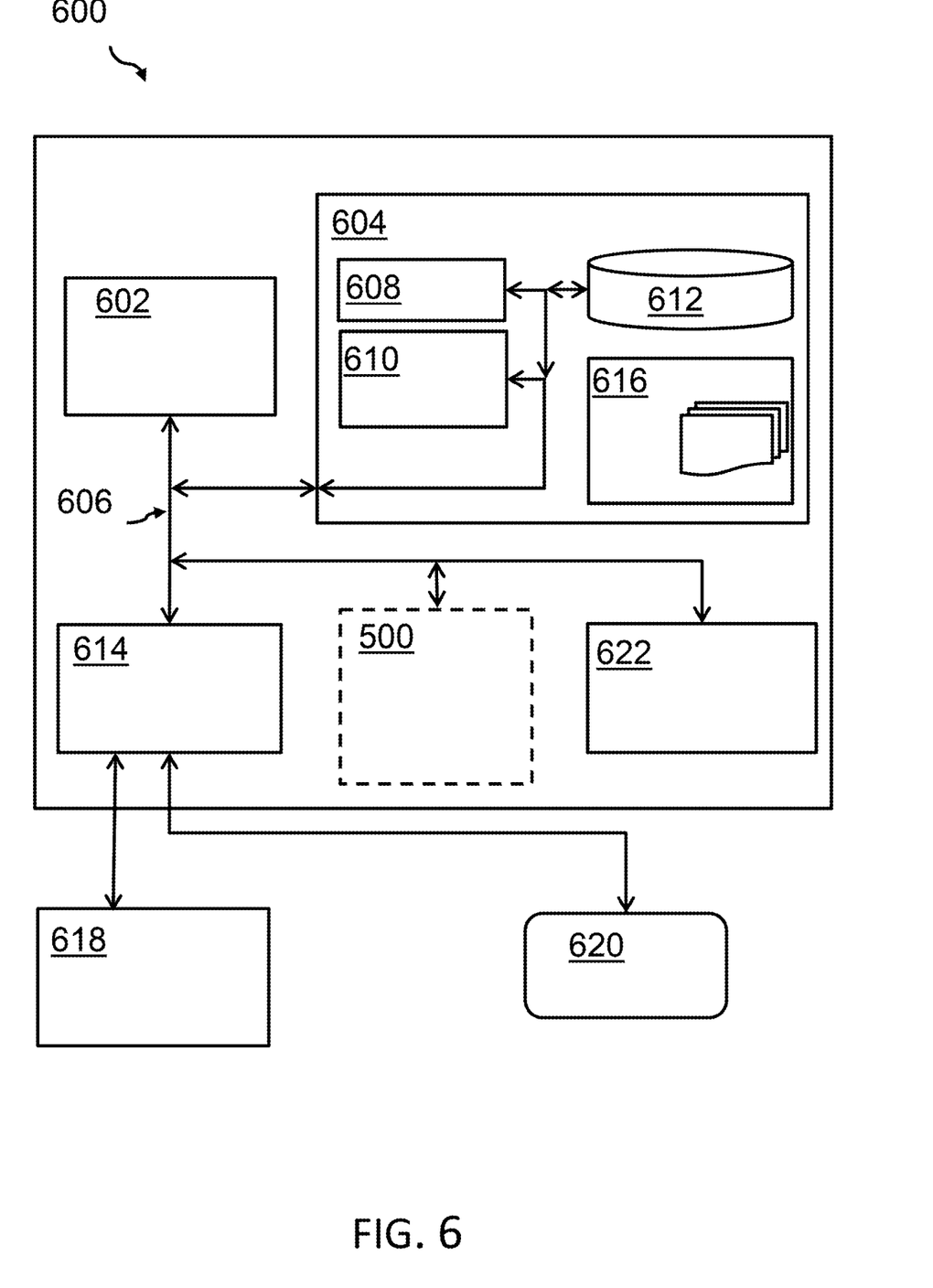
FIG. 6 shows an embodiment of a computing system comprising the database system according to FIG. 5.

Embodiments of the invention may be implemented together with virtually any type of computer, regardless of the platform being suitable for storing and/or executing program code. FIG. 6 shows, as an example, a computing system 600 suitable for executing program code related to the proposed method.

The computing system 600 is only one example of a suitable computer system and is not intended to suggest any limitation as to the scope of use or functionality of embodiments of the invention described herein, regardless, whether the computer system 600 is capable of being implemented and/or performing any of the functionality set forth hereinabove. In the computer system 600, there are components, which are operational with numerous other computing system environments or configurations. Examples of well-known computing systems, environments, and/or configurations that may be suitable for use with computer system/server 600 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 600 may be described in the general context of computer system-executable instructions, such as program modules, being executed by a computer system 600. Generally, program modules may include routines, programs, objects, components, logic, data structures, and so on that perform particular tasks or implement particular abstract data types. Computer system/server 600 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 600 is shown in the form of a general-purpose computing device. The components of computer system/server 600 may include, but are not limited to, one or more processors or processing units 602, a system memory 604, and a bus 606 that couple various system components including system memory 604 to the processor 602. Bus 606 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 600 typically includes a variety of computer system readable media. Such media may be any available media that is accessible by computer system/server 600, and it includes both, volatile and non-volatile media, removable and non-removable media.

The system memory 604 may include computer system readable media in the form of volatile memory, such as random access memory (RAM) 608 and/or cache memory 610. Computer system/server 600 may further include other removable/non-removable, volatile/non-volatile computer system storage media. By way of example only, a storage system 612 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 606 by one or more data media interfaces. As will be further depicted and described below, memory 604 may include at least one program product having a set (e.g., at least one) of program modules that are configured to carry out the functions of embodiments of the invention.

The program/utility, having a set (at least one) of program modules 616, may be stored in memory 604 by way of example, and not limiting, as well as an operating system, one or more application programs, other program modules, and program data. Each of the operating systems, one or more application programs, other program modules, and program data or some combination thereof, may include an implementation of a networking environment. Program modules 616 generally carry out the functions and/or methodologies of embodiments of the invention, as described herein.

The computer system/server 600 may also communicate with one or more external devices 618 such as a keyboard, a pointing device, a display 620, etc.; one or more devices that enable a user to interact with computer system/server 600; and/or any devices (e.g., network card, modem, etc.) that enable computer system/server 600 to communicate with one or more other computing devices. Such communication can occur via Input/Output (I/O) interfaces 614. Still yet, computer system/server 600 may communicate with one or more networks such as a local area network (LAN), a general wide area network (WAN), and/or a public network (e.g., the Internet) via network adapter 622. As depicted, network adapter 622 may communicate with the other components of the computer system/server 600 via bus 606. It should be understood that, although not shown, other hardware and/or software components could be used in conjunction with computer system/server 600. Examples, include, but are not limited to: microcode, device drivers, redundant processing units, external disk drive arrays, RAID systems, tape drives, and data archival storage systems, etc.

Additionally, the database system 500 for executing a query on a target database against a copy of the most recent source data may be attached to the bus system 606.

The descriptions of the various embodiments of the present invention have been presented for purposes of illustration but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi—conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the C programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms a, an, and the are intended to include the plural forms as well, unless the context clearly indicates otherwise. It will further be understood that the terms comprises and/or comprising, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

Embodiments of the present invention include the following summarized clauses for the method:

A computer-implemented method for executing a query on a target database against a copy of most recent source data is provided, comprising: maintaining linked databases comprising a source database and a related target database, wherein tables of the source database are continuously synchronized with respective tables in the target database; receiving a direct query against a table in the target database, the query comprising a request for using the most recent source data; requesting by the target database from the source database a status about latest data regarding the table; upon the status indicating that data in the table do not correspond to the most recent data, waiting a predefined time period for the most recent data of the table to be synchronized from the source database to the target database; and upon the data of the table not being synchronized within the predefined time period, issuing a timeout signal.

According to the previous clause, the requesting by the target database from the source database a status also comprises: upon the status indicating that data in the table correspond to the most recent data, executing the query.

According to either of the previous clauses, the synchronization from the target database to the source database is performed by reading a recovery log-file of the source database.

According to any of the preceding clauses, the target database is an in-memory database.

According to any of the preceding clauses, the source database is optimized for transactions and/or wherein the source database is a row-oriented relational database management system.

According to any of the preceding clauses, the target database is optimized for analytical operations and/or the target database is a column-oriented database management system.

According to any of the preceding clauses, the status about latest data regarding the table is a timestamp of a latest commit command executed by the source database for the table.

According to any of the preceding clauses, the continuous synchronization is performed by a bulk load to the target database.

According to any of the preceding clauses, the target database is used for read-only operations.

According to any of the preceding clauses, upon the table not being specified, using instead of the table all replicated tables of the target database.

Embodiments of the present invention include the following summarized clauses for the database system:

A database system for executing a query on a target database against a copy of the most recent source data is provided. The database system includes a processor and a memory, communicatively coupled to the processor. The memory stores program code portions that, when executed, enable the processor to: maintain linked databases comprising a source database and a related target database, wherein tables of the source database are continuously synchronized with respective tables in the target database; receive a direct query against a table in the target database, the query comprising a request for using the most recent source data; request by the target database from the source database a status about latest data regarding the table; upon the status indicating that data in the table do not correspond to the most recent data, wait a predefined time period for the most recent data of the table to be synchronized from the source database to the target database; and upon the data of the table not being synchronized within the predefined time period, issue a timeout signal.

According to the previous clause describing the database system, the requesting by the target database from the source database a status also comprises: upon the status indicating that data in the table correspond to the most recent data, executing the query.

According to either of the previous clauses describing the database system, the synchronization from the target database to the source database is performed by reading a recovery log-file of the source database.

According to any of the previous clauses describing the database system, the target database is an in-memory database.

According to any of the previous clauses describing the database system, the source database is optimized for transactions and/or wherein the source database is a row-oriented relational database management system.

According to any of the previous clauses describing the database system, target database is optimized for analytical operations and/or the target database is a column-oriented database management system.

According to any of the previous clauses describing the database system, the status about latest data regarding the table is a timestamp of a latest commit command executed by the source database for the table.

According to any of the previous clauses describing the database system, the continuous synchronization is performed by a bulk load to the target database.

According to any of the previous clauses describing the database system, the processor is also enabled, when executing the program code portions, to upon the table not being specified, using instead of the table all replicated tables of the target database.

A computer program product for executing a query on a target database against a copy of the most recent source data is provided. The computer program product comprising a computer readable storage medium having program instructions embodied therewith, the program instructions being executable by one or more computing systems or controllers to cause the one or more computing systems to: maintain linked databases comprising a source database and a related target database, wherein tables of the source database are continuously synchronized with respective tables in the target database; receive a direct query against a table in the target database, the query comprising a request for using the most recent source data; request by the target database from the source database a status about latest data regarding the table; upon the status indicating that data in the table do not correspond to the most recent data, wait a predefined time period for the most recent data of the table to be synchronized from the source database to the target database; and upon the data of the table not being synchronized within the predefined time period, issue a timeout signal.

What is claimed is:

1. A computer-implemented method for executing a query on a target database against a copy of a most recent source data, the method comprising:
   maintaining linked databases comprising a source database and a related target database, wherein tables of the source database are continuously synchronized with respective tables in the target database;
   receiving a direct query against a table in the target database, the query comprising a request for using the most recent source data, wherein the direct query does not originate in the source database of the linked databases or is not forwarded from the source database of the linked databases;
   in response to the query including an amount of time to wait for the most recent source data, the target database requesting a status about a latest data regarding the table in the query;
   requesting by a replication engine component to verify when the most recent source data are replicated to the target database, based on comparing timestamps of data records in the target database versus a timestamp of a commit statement for respective data in the source database for replicated tables in the query; and
   based on the replicated tables in the query being available prior to an expiration of the amount of time to wait, executing the query.

2. The method according to claim 1, wherein the requesting by the target database from the source database a status also comprises:
   upon the status indicating that data in the table correspond to the most recent data, executing the query.

3. The method according to claim 1, wherein the synchronization from the source database to the target database is performed by reading a recovery log-file of the source database.

4. The method according to claim 1, wherein the target database is an in-memory database.

5. The method according to claim 1, wherein the source database is optimized for transactions and/or wherein the source database is a row-oriented relational database management system.

6. The method according to claim 1, wherein the target database is optimized for analytical operations and/or the target database is a column-oriented database management system.

7. The method according to claim 1, wherein the status about latest data regarding the table is a timestamp of a latest commit command executed by the source database for the table.

8. The method according to claim 1, wherein continuous synchronization is performed by a bulk load to the target database.

9. The method according to claim 1, wherein the target database is used for read-only operations.

10. The method according to claim 1, further comprising:
upon the table not being specified, using instead of the table all replicated tables of the target database.

11. A database system for executing a query on a target database against a copy of a most recent source data, the database system comprising:
a processor and a memory, communicatively coupled to the processor, wherein the memory stores program code portions that, when executed, enable the processor to:
maintain linked databases comprising a source database and a related target database, wherein tables of the source database are continuously synchronized with respective tables in the target database;
receive a direct query against a table in the target database, the query comprising a request for using the most recent source data, wherein the direct query does not originate in the source database of the linked databases or is not forwarded from the source database of the linked databases;
in response to the query including an amount of time to wait for the most recent source data, the target database requests a status about a latest data regarding the table in the query;
a replication engine component requests to verify when the most recent source data are replicated to the target database, based on comparing timestamps of data records in the target database versus a timestamp of a commit statement for respective data in the source database for replicated tables in the query; and
based on the replicated tables in the query being available prior to an expiration of the amount of time to wait, execute the query.

12. The database system according to claim 11, wherein the requesting by the target database from the source database the status further comprises:
upon the status indicating that data in the table correspond to the most recent data, executing the query.

13. The database system according to claim 11, wherein the synchronization from the source database to the target database is performed by reading a recovery log-file of the source database.

14. The database system according to claim 11, wherein the target database is an in-memory database.

15. The database system according to claim 11, wherein the source database is optimized for transactions and/or wherein the source database is a row-oriented relational database management system.

16. The database system according to claim 11, wherein the target database is optimized for analytical operations and/or the target database is a column-oriented database management system.

17. The database system according to claim 11, wherein the status about the latest data regarding the table is a timestamp of a latest commit command executed by the source database for the table.

18. The database system according to claim 11, wherein continuous synchronization is performed by a bulk load to the target database.

19. The database system according to claim 11, wherein in response to the table not being specified, using all replicated tables of the target database.

20. A computer program product for executing a query on a target database against a copy of a most recent source data, the computer program product comprising a computer readable storage medium having program instructions embodied therewith, the program instructions being executable by one or more computing systems or controllers to cause the one or more computing systems to:
maintain linked databases comprising a source database and a related target database, wherein tables of the source database are continuously synchronized with respective tables in the target database;
receive a direct query against a table in the target database, the query comprising a request for using the most recent source data, wherein the direct query does not originate in the source database of the linked databases or is not forwarded from the source database of the linked databases;
in response to the query including an amount of time to wait for the most recent source data, the target database requests a status about a latest data regarding the table in the query;
a replication engine component requests to verify when the most recent source data are replicated to the target database, based on comparing timestamps of data records in the target database versus a timestamp of a commit statement for respective data in the source database for replicated tables in the query; and
based on the replicated tables in the query being available prior to an expiration of the amount of time to wait, execute the query.

* * * * *